United States Patent [19]
Yamauchi

[11] Patent Number: 5,963,900
[45] Date of Patent: Oct. 5, 1999

[54] POWER SAVING DECODER AND DATA RECOVERY APPARATUS UTILIZING THE SAME DECODER AND POWER SAVING DECODING METHOD

[75] Inventor: Yasuharu Yamauchi, Tokyo, Japan

[73] Assignee: Sony Corporation, Tokyo, Japan

[21] Appl. No.: 08/649,052

[22] Filed: May 16, 1996

[30] Foreign Application Priority Data

May 24, 1995 [JP] Japan ..................................... 7-148438

[51] Int. Cl.⁶ ....................................................... G10L 9/18
[52] U.S. Cl. ........................... 704/230; 704/212; 704/502
[58] Field of Search ................................. 395/2.38, 2.91, 395/2.09; 369/48, 59, 32, 47, 54; 360/32, 48, 27; 704/229, 500, 200, 230, 503, 211, 212, 219, 502

[56] References Cited

U.S. PATENT DOCUMENTS

| | | | |
|---|---|---|---|
| 4,937,805 | 6/1990 | Watanabe | 369/59 |
| 5,167,024 | 11/1992 | Smith et al. | 395/375 |
| 5,272,691 | 12/1993 | Watanabe | 369/124 |
| 5,377,050 | 12/1994 | Yun | 360/32 |
| 5,406,428 | 4/1995 | Suzuki | 360/53 |
| 5,566,379 | 10/1996 | Mawatari et al. | 360/48 |

FOREIGN PATENT DOCUMENTS

| | | | |
|---|---|---|---|
| 0693829 A1 | 1/1996 | European Pat. Off. | H03M 7/30 |
| 94/19801 | 9/1994 | WIPO | G11B 20/00 |

OTHER PUBLICATIONS

Patent Abstracts of Japan, JP 6–291672, Published Oct. 18, 1994, Matsushita Electric Ind. Co. Ltd.
Patent Abstracts of Japan, JP 5–315969, Published Nov. 26, 1993, Sanyo Electric Co. Ltd.

*Primary Examiner*—Richemond Dorvil
*Attorney, Agent, or Firm*—Limbach & Limbach L.L.P.

[57] ABSTRACT

There is provided a decoder and a data recovery apparatus which has enabled power saving by setting the band to which series of processes are not carried out among the N bands to vary the processing time required for the decoding operation within the predetermined time interval and extend non-operable period, on the occasion of independently executing the predetermined decoding operation in every band for the unit data obtained by dividing the compressed data into N (integer N≧2) bands for every predetermined time interval.

24 Claims, 6 Drawing Sheets

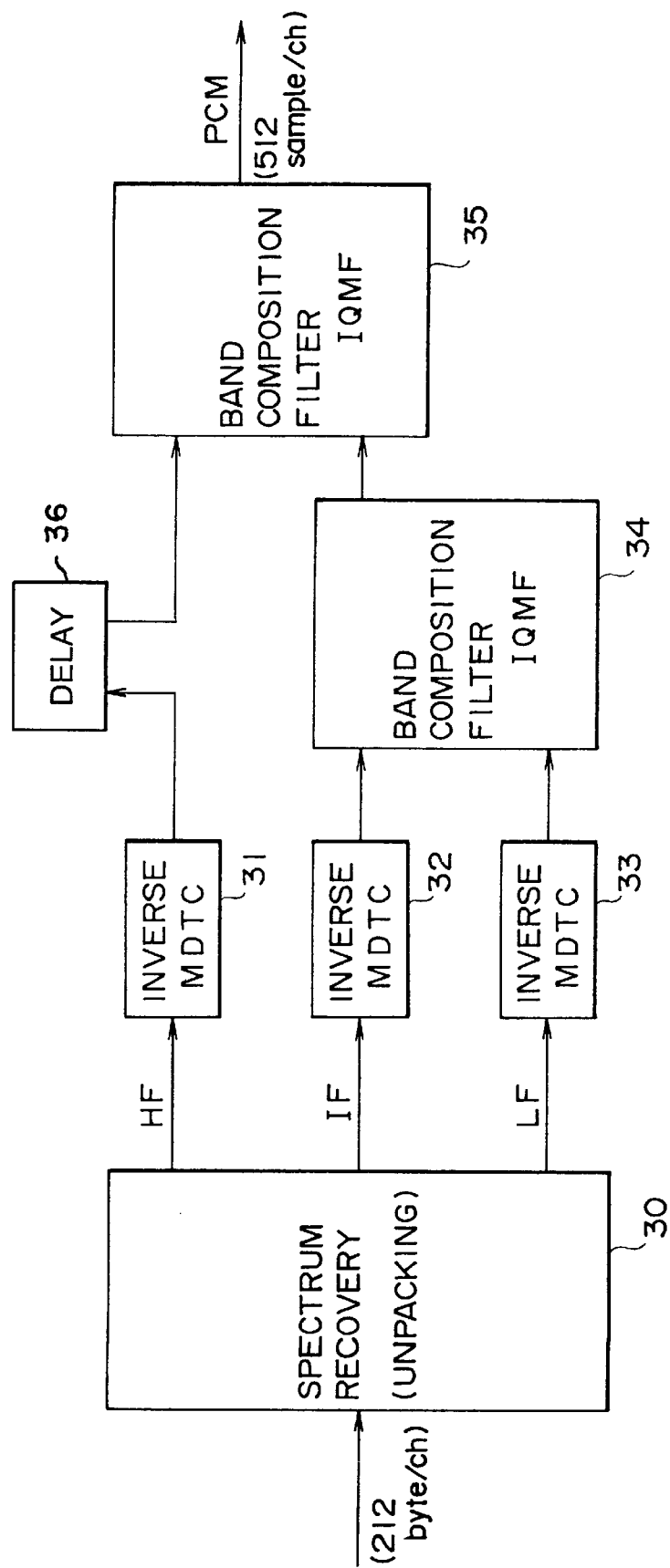

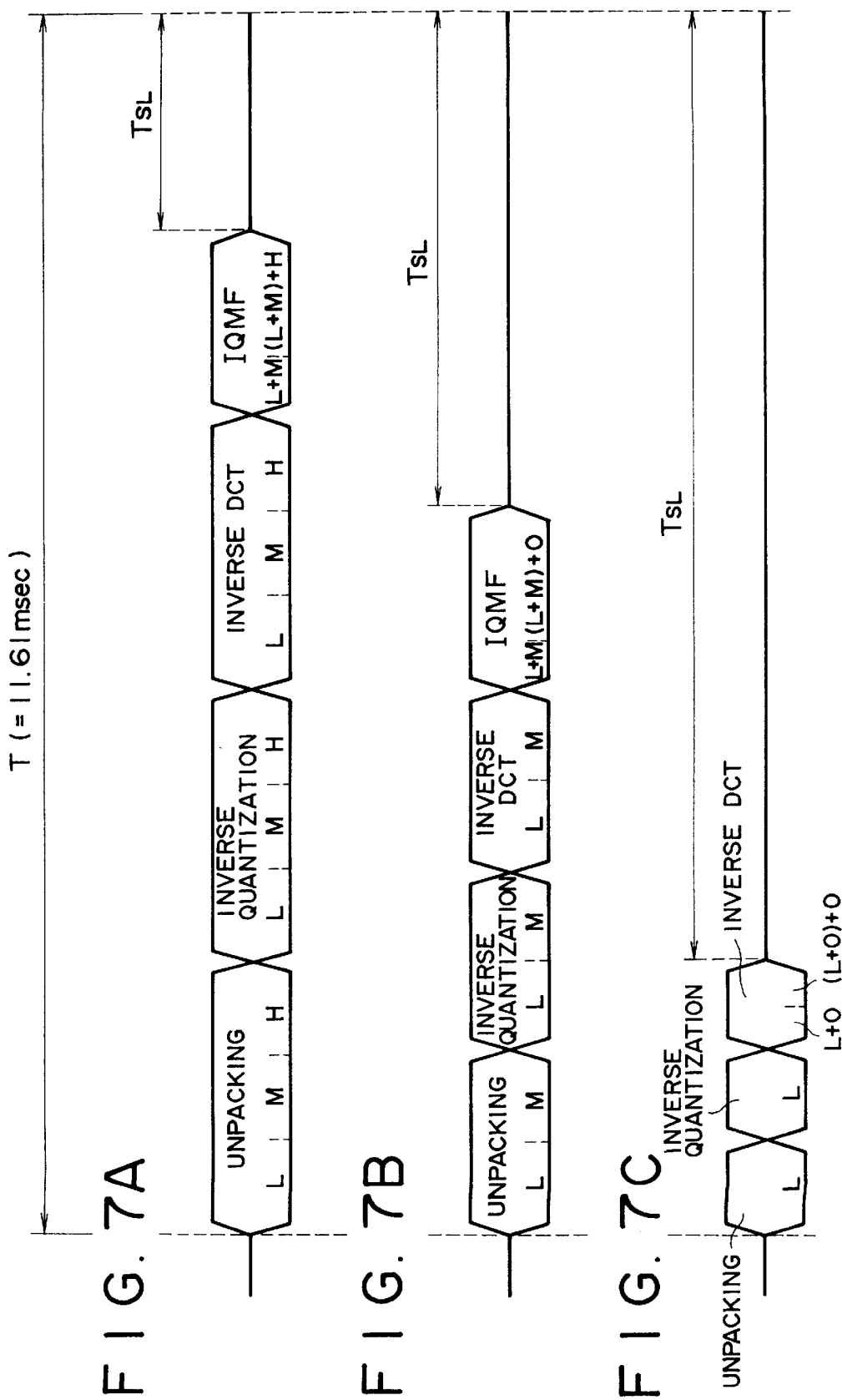

POWER SAVING DECODER AND DATA RECOVERY APPARATUS UTILIZING THE SAME DECODER AND POWER SAVING DECODING METHOD

FIELD OF THE INVENTION

The present invention relates to a data recovery apparatus in use for a recording medium such as a magneto-optic disk having recorded audio signal or the like and a decoder to be utilized for the same apparatus.

BACKGROUND OF THE INVENTION

A data programmable disk medium to which users are capable of recording a program such as audio data is well known and a disk system which has introduced a magneto-optic disk, for example, as a recording medium is already popular.

In this disk system, an audio signal is sampled at 44.1 kHz and quantized at 16 bits for conversion into digital audio data. Thereafter, this digital data is then subjected to audio compression process for creation of data recorded under the condition that it is compressed to one-fifth.

Therefore, in the data recovery apparatus, decoding is then required to expand, on the contrary, the data read from a disk. That is, after the data is recovered to the initial condition through the decoding operation, the data is then converted into analog audio signal.

While the disk system is utilized widely for variety of applications, it may be used for recording and recovery not only of audio signal but also of interview or conference data.

Along with variety of applications explained above, as a data recording and recovery apparatus, a small size and portable apparatus is just suitable and an apparatus also assuring monaural recording as well as stereophonic recording has been developed in response to the requirement for long-term recording. In the monaural recording, since the amount of data per unit time is reduced to a half, the recording time can be extended up to twice in comparison with that of the stereophonic recording.

When a battery-driven portable type data recording and recovery apparatus, for example, is discussed, it is a critical problem that the operation life of battery such as dry battery or chargeable battery used can be extended by saving the power consumption.

However, sufficient development has not yet been achieved for saving of power consumption in the data decoding for the audio compression system described above.

In consideration for such background, it is an object of the present invention to provide a decoder and a power saving data recovery apparatus.

SUMMARY OF THE INVENTION

In view of solving the problems explained above, the present invention provides a decoder comprising first restorer for restoring the compressed data in the predetermined block length into the spectrum for every N (integer equal to or larger than 2, $N \geq 2$) bands, quantizing means for inversely quantizing the spectrum restored by the first restorer for every N bands, converter for converting the data inversely quantized by the quantizing means into a time-series signal for every N bands, second restorer for restoring the band divided into N sections into a time-series signal, controller for controlling a series of decoding operations to execute for the predetermined block length in every predetermined time interval and switcher for turning the band, among the N bands described above, to which the series of processes described above are not executed into the non-operable condition.

Moreover, the present invention provides a data recovery apparatus comprising first restorer for restoring the compressed data recovered from a recording medium into spectrum for every N (integer equal to or larger than 2, $N \geq 2$) bands in unit of the predetermined block length unit in the predetermined time interval, quantizing means for inversely quantizing the spectrum restored by the first restorer for every N bands, converter for converting the data inversely quantized by the quantizing means into a time-series signal for every N bands, second restorer for restoring the band divided into N sections into a time-series signal, controller for controlling to process the series of decoding operations for every predetermined block length in the predetermined time interval, selector for designating the bands, to which series of processes are not executed, among the N bands and controller for controlling series of the processes corresponding to the bands designated by the selector into the non-operable condition.

When high quality sound is not required for the recovered audio signal as in the case of recovering the audio data of conference and interview, any practical problem does not arise even if the decoding is not executed for a certain band, such as a high frequency band. Therefore, processing steps can be reduced as the unit in amount of decoding operation by setting the bands to which the decoding is not executed and thereby power consumption can be as much saved.

BRIEF DESCRIPTION OF THE DRAWINGS

FIG. 6 shows a block diagram of an audio compressed and expanded encoder and decoder for use in the present invention.

FIG. 7A shows a timing chart illustrating series of decoding operations for each band of three divided bands.

FIG. 7B shows a timing chart illustrating series of decoding operations for selected two bands among three divided bands.

FIG. 7C shows a timing chart illustrating series of decoding operations for one selected band among three divided bands.

DESCRIPTION OF THE PREFERRED EMBODIMENTS

The preferred embodiments of the present invention will then be explained with reference to FIG. 1 to FIG. 6. As the embodiments, a data recovery apparatus and a decoder to be utilized in such data recovery apparatus will be explained as the magneto-optic disk system.

Figure 1:
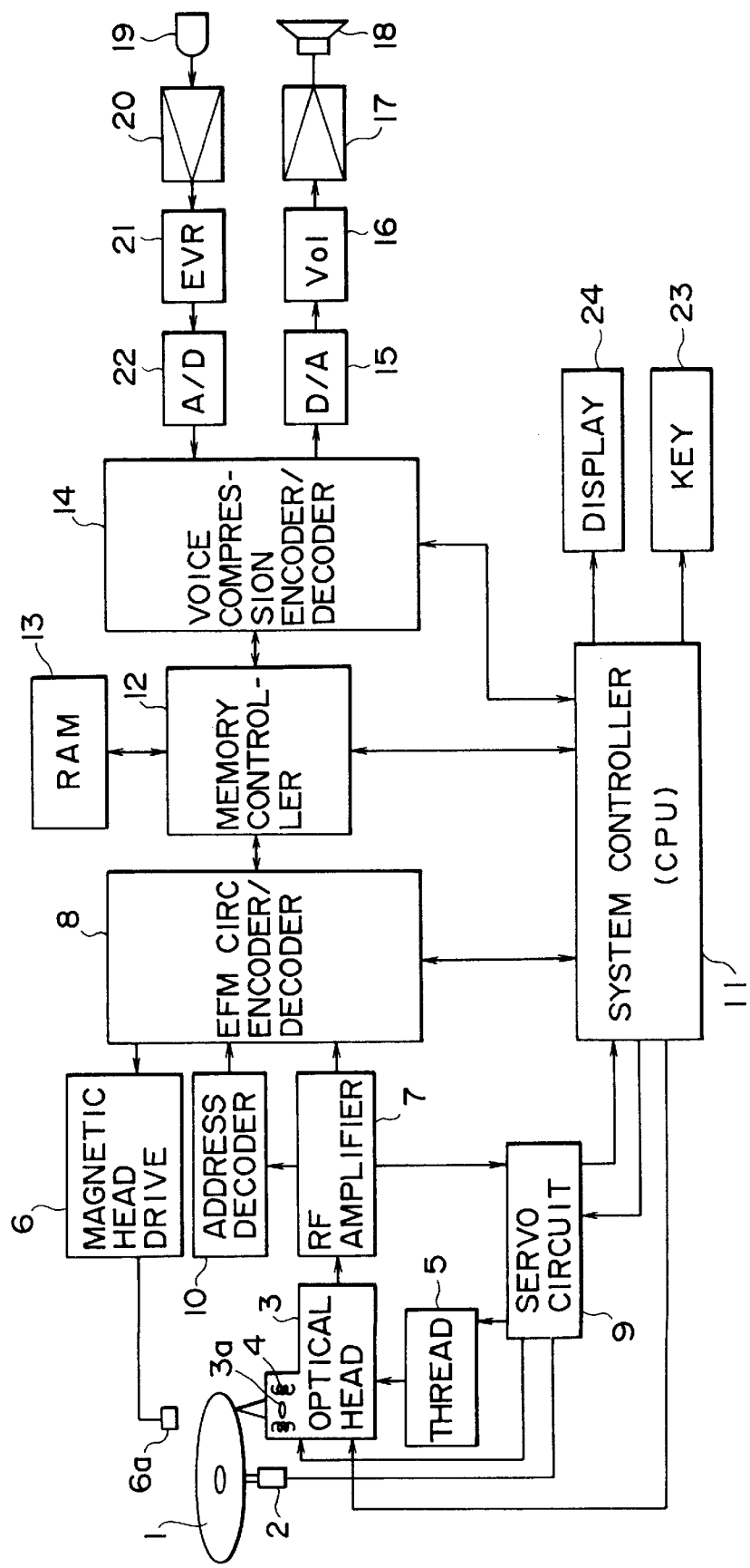
FIG. 1 shows a block diagram of a magneto-optic disk apparatus of the present invention.

FIG. 1 shows a block diagram of the essential portion of a data recording and recovery apparatus utilizing a magneto-optic disk as a recording medium representing an embodiment of the present invention.

A magneto-optic disk 1 is used as a medium allowing recording of the audio data. This disk 1 is rotatably driven with a spindle motor 2 during recording and recovering operations. An optical head 3 performs the data recording and recovering operations by irradiating a magneto-optic disk 1 with a laser beam. That is, during the data recording operation, the optical head 3 outputs a high level laser beam for heating the recording tracks up to the Curie temperature, while during the data recovering operation, the head outputs a comparatively lower level laser for detecting data from the reflected beam utilizing the magnetic Kerr effect.

Therefore, the optical head 3 is provided with a laser diode as a laser output means, an optical system consisting of polarized beam splitter and objective lens, etc. and a detector for detecting reflected light beam. The objective lens 3a is forcibly held movable, by a 2-axis mechanism 4, in the disk radius direction and in the direction accessible to and separable from the disk. The optical head 3 as a whole is provided movable in the disk radius direction by a sled mechanism 5.

Moreover, the magnetic head 6a is provided at the location opposed to the optical head 3 positioning therebetween the magneto-optic disk 1. This magnetic head 6a operates to apply the magnetic field modulated by the supplied data to the magneto-optic disk 1.

The magnetic head 6a is provided movable together with the optical head 3 by the sled mechanism 5 in the disk radius direction.

Information detected from the magneto-optic disk 1 by the optical head 3 is supplied to an RF amplifier 7 as a part of the data recovery operation. The RF amplifier 7 extracts, with the arithmetic operation of the supplied information, the recovered RF signal, tracking error signal, focus error signal and groove information (absolute position information recorded on the magneto-optic disk 1 as the pre-groove (wobbling groove)), etc. The extracted recovered RF signal is then supplied to an encoder/decoder 8. Moreover, the tracking error signal and focus error signal are supplied to a servo circuit 9 and the groove information is supplied to an address decoder 10 for demodulation. The address information obtained by decoding the groove information and address information which is recorded as the data and decoded in the encoder and decoder 8 are then supplied to a system controller 11 constituted by a microcomputer.

The servo circuit 9 generates various kinds of servo drive signals from the tracking error signal and focus error signal supplied and from the track jump command, access command and rotating velocity detecting information, etc. supplied from the system controller 11 in order to control the 2-axis mechanism 4 and thread mechanism 5 for the focus and tracking controls, thereby controlling the spindle motor 2 at a constant linear velocity.

The recovered RF signal is subjected to the decoding operations such as EFM demodulation and CIRC demodulation in the encoder and decoder 8 and is then written once into a buffer memory 13 by a memory controller 12. Here, data is read by the optical head 3 from the magneto-optic disk 1 and the recovered data by the optical head 3 is then transferred up to the buffer memory 13 at the rate of 1.41 Mbit/sec.

The data once written into the buffer memory 13 is read in such a timing that the recovered data is transferred at rate of 0.3 Mbit/sec and is then supplied to the encoder and decoder 14 for compressing and expanding the audio signal. In the magnetic disk system of the present invention, data is recorded to the disk 1 in such a manner that amount of data is compressed to about one-fifth. Therefore, during the data recovering operation, the encoder and decoder 14 for compressing and expanding audio signal executes the decoding process for expanding, on the contrary, the data up to five times in amount.

In this embodiment, three modes are prepared as the decoding operations and therefore the encoder and decoder 14 for compressing and expanding audio signal performs the decoding process in the mode set under the control of the system controller 11. This decoding process will be explained later.

The encoder and decoder 14 for compressing and expanding audio signal executes the expanding process for compressed audio signal through an inverted modified discrete cosine transform (DCT) operation. When the digital data of sampling of 44.1 kHz and quantization of 16 bits is restored, such data is then supplied to a D/A converter 15 for conversion into an analog audio signal.

An output of the D/A converter 15 is adjusted for sound level (amplitude level) by a sound level adjusting means 16 and is then amplified by a power amplifier 17. Finally, the data is output, for example, as the audible voice from a loud speaker 18.

The data recovering operation has been explained above, and the data recording operation will then be explained hereunder. For initiation of the recording operation to the magneto-optic disk 1, an audio signal collected through a microphone 19 is amplified by a microphone amplifier 20, an input audio level of the audio signal is adjusted by an electronic volume control 21 and the level adjusted audio signal is then applied to an A/D converter 22.

The A/D converter 22 converts the input audio signal into the digital data in the sampling of 44.1 kHz and quantization of 16 bits. Thereafter, the input audio signal is impressed to the encoder and decoder 14 for compressing and expanding the audio signal and is subjected to the encoding process for compression of audio signal. That is, the audio data is compressed into about one-fifth in amount of data by the encoding process such as inverted modified DCT process, etc.

The recording data compressed by the encoder and decoder 14 for compressing and expanding audio signal is once written into the buffer memory 13 by the memory controller 12 and is then read in the predetermined timing for the transfer to the encoder and decoder 8.

The signal having completed the encoding process such as CIRC encoding, EFM modulation, etc. in the encoder and decoder 8 is then supplied to the magnetic head drive circuit 6.

The magnetic head drive circuit 6 supplies a magnetic head drive signal to the magnetic head 6a, depending on the encoded recording data. Namely, the magnetic head 6 is caused to apply the magnetic field of N or S to the magneto-optic disk 1. Moreover, in this case, the system controller 11 supplies a control signal to the optical head 3 in order to output a laser beam in the recording level.

An operation panel 23 is provided with a recording key, a recovery key, a stop key, an auto music sensor (AMS) key and a search key, etc. for the convenience of user operation. Moreover, a mode selection key is also provided for selecting the mode to realize saving of power consumption during the decoding operations explained later.

In the display means 24, the time information such as a total recording time of a disk and a running time during recovering and recording operations and various data such as program number, operating condition and operation mode are displayed under the control of the system controller 11.

A format of cluster which is a unit of recording operation in the magnetic disk system of the present invention will then be explained.

Figure 2:
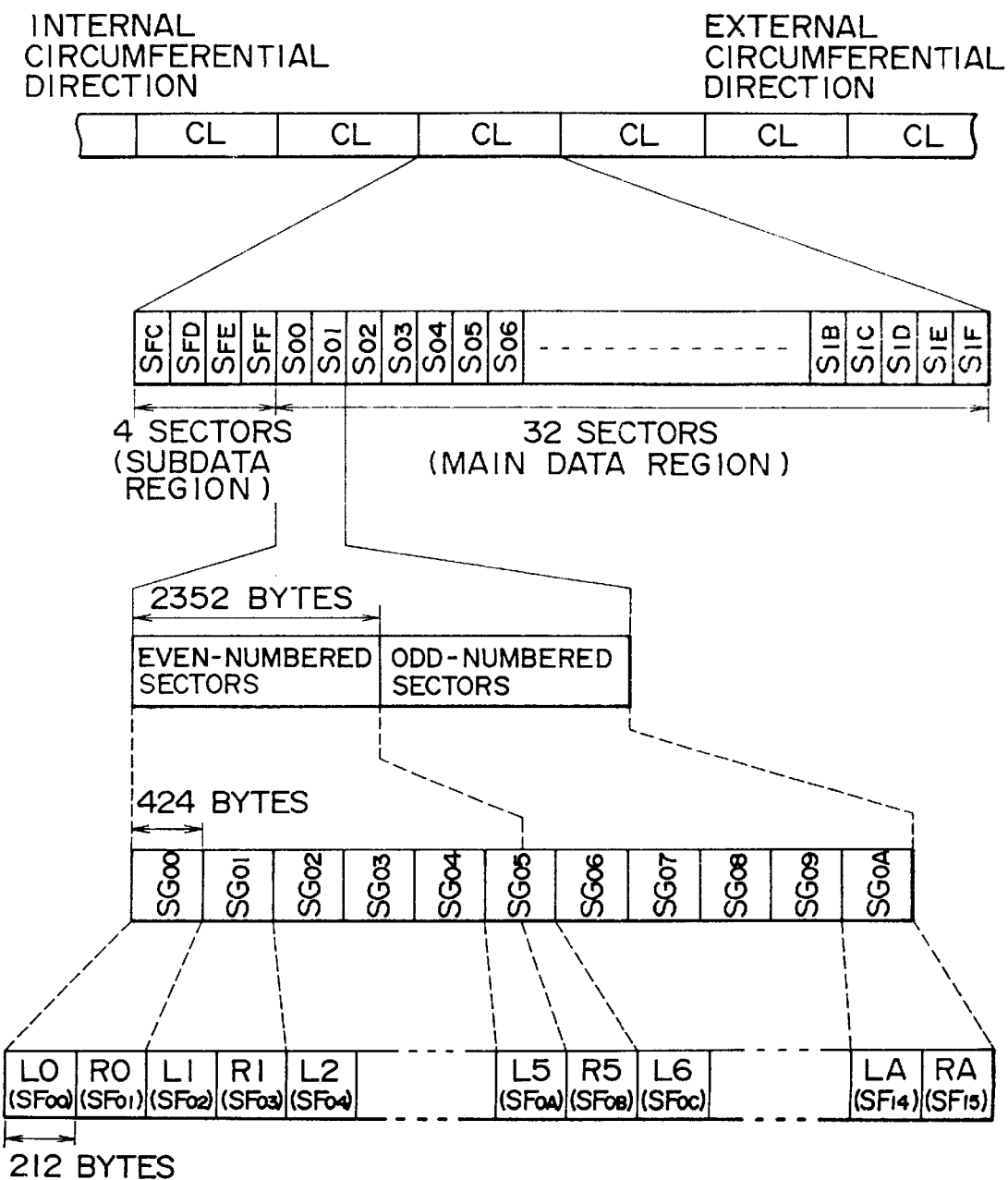
FIG. 2 shows a data format recorded on a magneto-optic disk for use in the present invention.

As the recording track in the magnetic disk system of the present invention, cluster CL is formed continuously as shown in FIG. 2 and one cluster is defined as the minimum unit for recording operation. One cluster corresponds to two to three circumferential tracks.

One cluster CL is formed by subdata region of four sectors from $S_{FC}$ to $S_{FF}$ and the main data region of 32 sectors from $S_{00}$ to $S_{1F}$. One sector is a data unit formed of 2352 bytes.

The subdata region of 4 sectors is used as the subdata and linking area and recording of audio data is carried out in the main data region of 32 sectors. Address is recorded for every one sector.

Moreover, the sector is further subdivided into a unit called sound groove and two sectors are subdivided into 11 sound grooves.

That is, as illustrated, continuous two sectors of the even number sectors such as sector $S_{00}$ and the odd number sectors such as sector $S_{01}$ include the sound grooves $SG_{00}$ to $SG_{0A}$. One sound groove is formed of 424 bytes, providing the amount of audio data corresponding to the time of 11.61 msec.

One sound groove SG allows recording of data in both right and left channels. For example, the sound groove $SG_{00}$ is composed of the left channel data L0 and right channel data R0, while the sound groove $SG_{01}$ is formed of the left channel data L1 and right channel data $R_1$.

212 bytes which form a data region of the left channel or right channel constitutes a sound frame.

In the case of monaural recording and recovering of data, there is no need for discrimination of right and left channels. Therefore, the left channel data L0 to right channel data RA are used, for data of one channel, as the sound frames $SF_{00}$ to $SF_{15}$ of 22 units as shown in the figure.

Therefore, in the monaural system, the recording is possible for the period two times that in the stereophonic system. Moreover, since data of one sound frame is recovered as the output data after the decoding process for the compression process, the audio data corresponding to the time of 11.61 msec can be obtained.

Data is recorded on the disk 1 in such a format, but the decoding process in the encoder and decoder 14 for compressing and expanding audio signal is carried out in unit of sound frame, for example, by dividing the sound frame into three bands.

FIG. 3A to FIG. 3C shows the timing of the expanding process for the compressed audio data.

In the case of monaural recording and recovering operations, the processes for one sound frame read from the disk 1 must be completed at least within 11.61 msec. In the stereophonic system, since the processes for two sound frames are performed within 11.61 msec, the processing time for one sound frame is 5.8 msec or less.

It is of course preferable that the processing rate is higher than such value, but the decoding operation of one operation unit is usually completed with some tolerance within the above operation period, in order to save the power consumption, using the adequately slower operation clock.

Here, the decoding operation period for the processing of one sound frame is assumed as time T in FIG. 3A. That is, the decoding operation request of the sound frame is issued in every T period. The period T is 11.61 msec in the monaural system, while 5.8 msec in the stereophonic system.

When the period $T_{DC}$ is determined, as a result of design, to be required usually for the decoding process of one sound frame as shown in FIG. 3B, in the period $T_{SL}$ until the next decode timing, the decoding process is controlled to OFF state and the encoder and decoder 14 for compressing and expanding audio signal can be disabled.

The sound frame data decoded in the period $T_{DC}$ is held in the buffer within the encoder and decoder 14 for compressing and expanding audio signal and is output to the D/A converter 15 as the output data of the next period of 11.61 msec as shown in FIG. 3C.

In such decoding process, it is enough for the encoder and decoder 14 for compressing and expanding audio signal to start depending on the initialization command and turn OFF when the processing is completed at the period $T_{DC}$, namely electrical power is not consumed for the decoding process during the period $T_{SL}$. Therefore, it can be understood that saving of power consumption can be realized by completing the decoding process within a short period of time and elongating the period $T_{SL}$ without increasing the rate of the operation clock.

Operations for reducing power consumption during the decoding process in the embodiment of the present invention will be explained.

The processes in the encoder and decoder 14 for compressing and expanding audio signal in the magneto-optic disk system are subdivided in three bands for execution.

Figure 4:
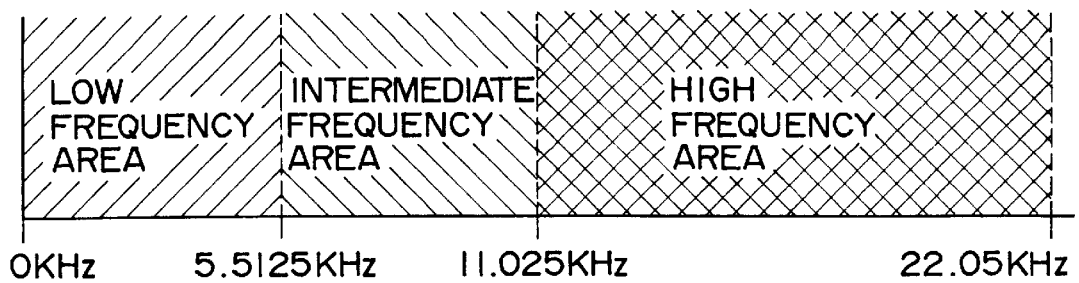
FIG. 4 shows an example of the band division of the compressed data in unit of block for use in the present invention.

On the occasion of audio compression encoding for the recording data, this data is subdivided, as shown in FIG. 4, into the low frequency band from 0 to 5.5125 kHz, intermediate frequency band up to 11.025 kHz and high frequency band up to 22.05 kHz.

The time axis signal of each band is converted to spectrum in every block by the inverted modified discrete cosine transform (DCT) process for every band and thereafter data is interleaved for data compression.

During the recording operation, such compressed data is created as the minimum unit for every sound frame SF and is recorded on the disk 1. Therefore, it is enough to perform the processes in the flow shown in FIG. 5 as the decoding process during the data recovery operation. That is, it is the inverse processes for those during the encoding operation.

In response to the low, intermediate and high frequency bands, unpacking, inverse quantization and inverted modified discrete cosine transform (DCT) processes are performed for the data in unit of sound frame unit supplied via the buffer memory 13 during the data recovery operation. Thereafter, the decoding process is completed, as indicated by inverted quadrature mirror filter (IQMF), by combining the intermediate and low frequency bands and also combining the intermediate, low and high frequency bands.

Figure 5:
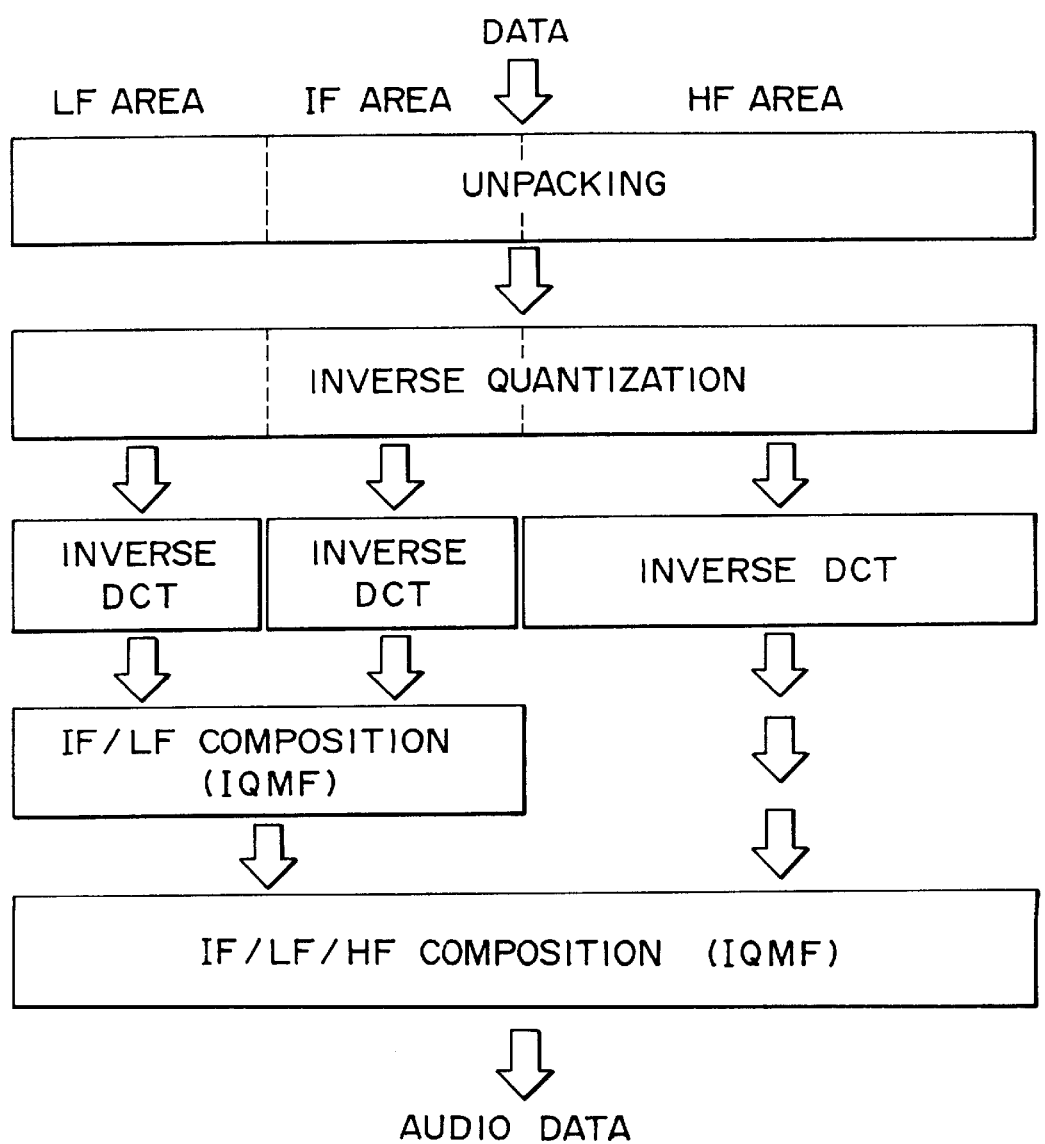
FIG. 5 shows series of decoding operations for every divided band for use in the present invention.

In this embodiment, the decoding process is performed, in the ordinary mode, in the processing flow shown in FIG. 5. If high frequency data is not requested as the recovered data, the decoding is performed only for the low and intermediate frequency bands, except for the high frequency band.

Moreover, when audio quality may be further lowered because it is enough, for example, that only contents of the conference can be obtained, the decoding is performed only to the low frequency band, without execution of the decoding operation for both high and intermediate frequency bands.

FIG. 6 shows a block diagram of the encoder and decoder 14 for compressing and expanding audio signal shown in FIG. 1 of the present invention.

The compressed data of 212 bytes/ch from the memory controller is restored (unpacked), for every frequency band, as the frequency spectrum by the spectrum restorer 30. The restored spectrum for every frequency band is converted to the time series signals of three frequency bands by the inverted MDCT units 31, 32, 33. Thereafter, the intermediate and low frequency bands elements are combined in the inverted quadrature mirror filter 34 and only the high frequency element is applied to the inverted quadrature mirror filter 35 via the delay unit 36. Further combining of the outputs from both the inverted quadrature mirror filters 34 and 35 provides the time series signals for all frequency bands.

Moreover, in this embodiment, the operation modes in which the decoding is not executed for the high frequency band and high and intermediate frequency bands are also provided in addition to the ordinary operation mode in order to reduce the number of steps for the decoding operations. Thereby, the period $T_{SL}$ in FIG. 3 can be expanded to assure the power saving effect. Switching of operation mode can be realized depending on the mode selecting operation by user, for example, at the operating panel 23.

FIG. 7A to FIG. 7C show the timing chart of the decoding operations in the three modes.

Figure 3:
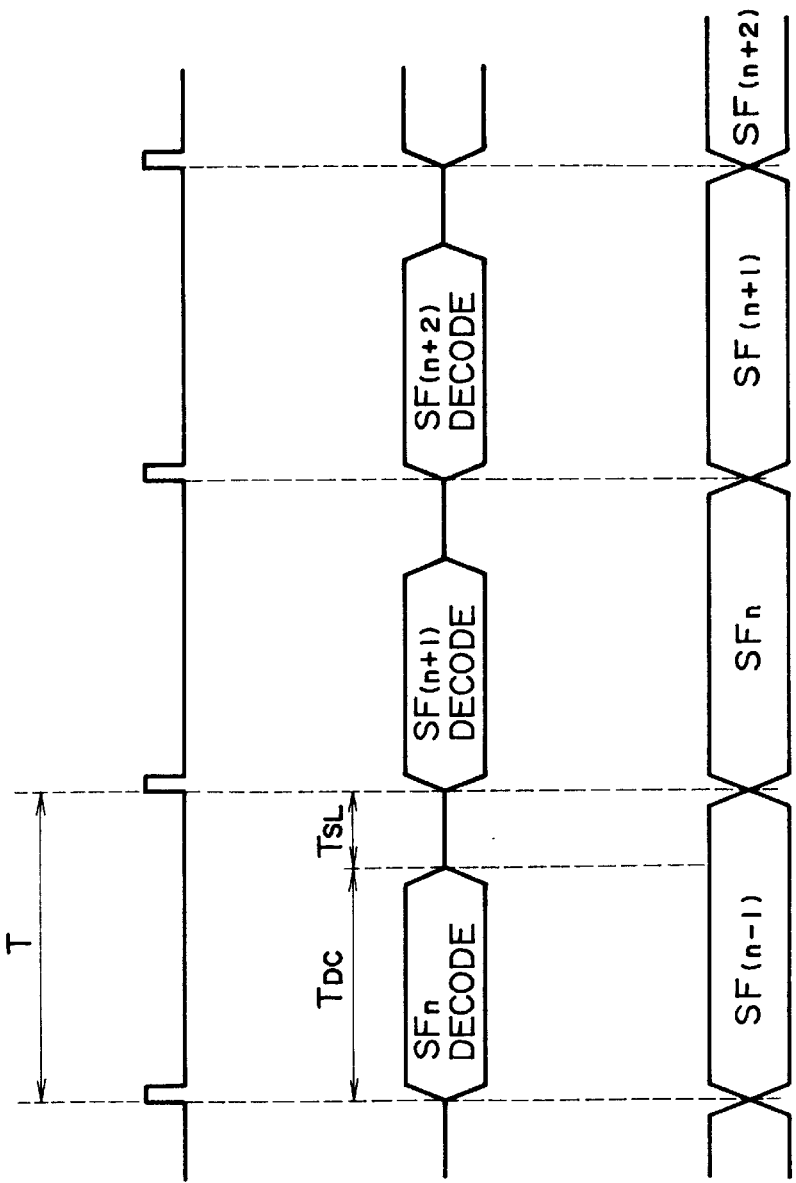
FIG. 3A shows processing times in unit of block of the compressed data for use in the present invention.
FIG. 3B shows decode processing times and pause times in unit of block of the compressed data of the present invention.
FIG. 3C shows output timings in unit of block of the decoded expanded data for use in the present invention.

For example, as explained in regard to FIG. 3, the decoding operation for one sound frame is performed at the time T, but this decoding operation is executed at the timing of FIG. 7A in the ordinary mode.

The unpacking operation is independently performed on the time division basis for the low (L), mediate (M) and high (H) frequency bands. Successively, the inverse quantizing operation is also independently performed on the time division basis for the low (L), mediate (M) and high (H) frequency bands. Moreover, the inverted modified DCT operation is also performed independently for the low (L), mediate (M) and high (H) frequency bands.

Thereafter, as the IQMF operation, operations for high, mediate and low frequency bands are combined, thus completing the decoding operation.

After completion of the decoding operation, the operation is in the OFF state during the period $T_{SL}$ until initiation of the next decoding operation.

Next, in the data recovery mode in which the data of the high frequency band is not required, the decoding operation is performed in the timing shown in FIG. 7B.

First, the unpacking operations for the low (L) and mediate (M) frequency bands are independently performed on the time division basis. Subsequently, the inverted quantizing operation is also independently performed on the time division basis for the low (L) and mediate (M) frequency bands. Moreover, inverted modified DCT operation is also independently performed for the low (L) and mediate (M) frequency bands.

Thereafter, as the IQMF operation, the mediate and low frequency band data are combined and moreover this combined data is further combined with the zero data of the high frequency band, thus completing the decoding operation.

In this case, after completion of the decoding operation, the operation is in the OFF state during the period TSL until initiation of the next decoding operation. However, as will be understood from comparison with FIG. 7A, the period TSL is longer than that in the ordinary operation mode. Therefore, since the operation OFF state becomes longer as much as explained above, power consumption can be saved in such a degree.

Moreover, in the operation mode in which high frequency element is not required, the unpacking operation, inverted quantizing operation and inverted modified DCT operation are performed only for the low frequency band (L) as shown in FIG. 7C, and thereafter the data is further combined with the zero data corresponding to the mediate and high frequency bands, thus completing the decoding operation.

Accordingly, in the case of this operation mode, the period $T_{SL}$ becomes still longer, resulting in the further longer operation OFF state, thereby remarkably saving the power consumption.

For example, as the practical power saving method, it is also possible that clocking of the encoder and decoder 14 for compressing and expanding audio signal is stopped during the period $T_{SL}$ as the pause period and power supply to the inverted quantizing unit for high frequency band, inverted DCT converter and inverted quadrature mirror filter (IQMF) which do not perform the abovementioned decoding operation is stopped.

However, it is a matter of course that sufficient power saving can be achieved by expanding the ordinary pause period $T_{SL}$, even without stopping the clock and supplying the power to each operation block explained above.

As described, in this embodiment, the number of operation steps as the decoding operation is changed depending on the sound quality obtained of the recovering audio signal. Namely, when high frequency element is not requested, the number of decoding operation steps can be reduced to reduce the power consumption by not executing the decoding operations for the high frequency band or the high and mediate frequency bands. Thereby, longer operation life of battery can be realized.

Meanwhile, since it can be thought that recording is performed in the monaural recording system when the high frequency band data is not requested, it is also allowed that the decoding operations shown in FIG. 7B or FIG. 7C is executed automatically for recovery of the audio data recorded by the monaural recording system.

In addition, the present invention can be applied for the encoding operation. That is, when high frequency data is not required, operation for the high frequency band is not executed during the encoding operation and thereby the number of operation steps can be reduced to save the power consumption.

Moreover, in the embodiment described above, the present invention has been applied to the magneto-optic disk system, but the present invention can also be applied, in the other audio data recovery system, to the decoder for executing the decoding operation in regard to the audio signal compression operation for every subdivided frequency band.

The present invention can naturally be applied also to the data recovery apparatus and decoder where a recording medium is selected to the other medium other than the disk type medium, for example, the tape type recording medium.

As explained above, the present invention is capable of varying the number of operation steps required for the decoding operation within the predetermined time interval by setting the frequency band for which the decoding operation is not carried out among the first to nth frequency bands in the decoder where the decoding for the audio data is performed by independently executing the operation in every frequency band for the unit data as the first to nth divided frequency bands depending on the decoding requirement for every predetermined time interval. Therefore, when the high quality sound is not required for the audio data to be recovered, the decoding operation is not executed for the selected bands such as high frequency band to reduce the amount of the decoding operation steps. Accordingly, the present invention provides the effect that high speed decoding operation can be achieved and resultant reduction of power consumption can also be attained without using a means for assuring high speed operation clock.

What is claimed is:

1. A decoder for decoding data into a signal corresponding to an audio signal, comprising:

first restoring means for restoring compressed data in a predetermined block length into a spectrum of N bands, where N is an integer having a value of at least 2;

inverse quantizing means for inversely quantizing the spectrum restored by said first restoring means;

converting means for converting the spectrum into a time-series signal;

second restoring means for restoring a plurality of time-series signals into a restored time-series signal corresponding to an audio signal;

control means for controlling, for said predetermined block length during a predetermined time interval, said first restoring means, said inverse quantizing means, said converting means, and said second restoring means; and selecting means for designating which of said N bands are to be processed by said first restoring means, said inverse quantizing means, said converting means, and said second restoring means.

2. The decoder as set forth in claim 1, wherein a clock signal is supplied to said first restoring means, said inverse quantizing means, said converting means, and said second restoring means only when processing the designated bands.

3. The decoder as set forth in claim 1, wherein said compressed data comprises audio data.

4. The decoder as set forth in claim 1, further comprising:

a second control means which varies a processing time, within said predetermined time interval, based on the designated bands, such that said first restoring means, said inverse quantizing means, said converting means, and said second restoring means operate during said processing time.

5. A data recovery apparatus for decoding data into a signal corresponding to an audio signal, comprising:

first restoring means for restoring compressed data in a predetermined block length recovered from a recording medium into a spectrum for every N bands, where N is an integer having a value of at least 2;

inverse quantizing means for inversely quantizing the spectrum restored by said first restoring means;

converting means for converting the spectrum into a time-series signal;

second restoring means for restoring a plurality of time-series signals into a restored time-series signal corresponding to an audio signal;

first control means for controlling, for said predetermined block length during a predetermined time interval, said first restoring means, said inverse quantizing means, said converting means, and said second restoring means;

selecting means for designating which of said N bands are to be processed by said first restoring means, said inverse quantizing means, said converting means, and said second restoring means; and second control means for controlling said first restoring means, said inverse quantizing means, said converting means, and said second restoring means, based on the designated bands.

6. The data recovery apparatus as set forth in claim 5, wherein a clock signal is supplied to said first restoring means, said inverse quantizing means, said converting means, and said second restoring means only when processing the designated bands.

7. The data recovery apparatus as set forth in claim 5, wherein said compressed data comprises audio data.

8. The data recovery apparatus as set forth in claim 5, wherein said second control means varies a processing time, within said predetermined time interval, during which said first restoring means, said inverse quantizing means, said converting means, and said second restoring means operate.

9. A method for decoding compressed data into a signal corresponding to an audio signal, comprising the steps of:

designating which of N bands, where N is an integer having a value of at least 2, are to be processed in a predetermined time interval;

restoring compressed data in a predetermined block length into a spectrum for the designated bands;

inversely quantizing the spectrum restored in said step of restoring;

converting the spectrum into a time-series signal; and restoring a plurality of time-series signals into a restored time-series signal corresponding to an audio signal.

10. The method as set forth in claim 9, further comprising the step of:

providing a clock signal for controlling, only when processing the designated bands, said step of restoring compressed data, said step of inversely quantizing, said step of converting and said step of restoring a plurality of time-series signals.

11. The method as set forth in claim 9, wherein said compressed data comprises audio data.

12. The method as set forth in claim 9, further comprising the step of:

varying a processing time, within said predetermined time interval, based on the designated bands, such that said step of restoring compressed data, said step of inversely quantizing, said step of converting the spectrum, and said step of restoring a plurality of time-series signal are performed during said processing time.

13. A method of recovering data into a signal corresponding to an audio signal, comprising the steps of:

designating which of N bands, where N is an integer having a value of at least 2, are to be processed in a predetermined time interval;

restoring compressed data in a predetermined block length recovered from a recording medium into a spectrum for the designated bands;

inversely quantizing the spectrum restored in said step of restoring;

converting the spectrum into a time-series signal; and restoring a plurality of time-series signals into a restored time-series signal.

14. The method as set forth in claim 13, further comprising the step of:

provi ding a clock signal for controlling, only when processing the designated bands, said step of restoring compressed data, said step of inversely quantizing, said step of converting and said step of restoring a plurality of time-series signals.

15. The method as set forth in claim 13, wherein said compressed data comprises audio data.

16. The method as set forth in claim 13, further comprising the step of:

varying a processing time, within said predetermined time interval, based on the designated bands, such that said step of restoring compressed data, said step of inversely quantizing, said step of converting the spectrum, and said step of restoring a plurality of time-series signal are performed during said processing time.

17. A decoder for decoding data into a signal corresponding to an audio signal, comprising:

a spectrum restorer circuit configured to restore compressed data in a predetermined block length into a spectrum of N bands, where N is an integer having a value of at least 2;

said spectrum restorer circuit being further configured to inversely quantize the spectrum restored thereby;

at least one inverse modified discrete cosine transform circuit configured to convert the spectrum into a time-series signal;

at least one band composition filter circuit configured to restore a plurality of time-series signals into a restored time-series signal corresponding to an audio signal;

a system controller circuit configured to control, for said predetermined block length during a predetermined time interval, said spectrum restorer circuit, said at least one inverse modified discrete cosine transform circuit, and said at least one band composition filter circuit; and a mode selection key configured to designate which of said N bands are to be processed by said spectrum restorer circuit, said at least one inverse modified discrete cosine transform circuit, and said at least one band composition filter circuit.

18. The decoder as set forth in claim 17, wherein a clock signal is supplied to said spectrum restorer circuit, said at least one inverse modified discrete cosine transform circuit, and said at least one band composition filter circuit only when processing the designated bands.

19. The decoder as set forth in claim 17, wherein said compressed data comprises audio data.

20. The decoder as set forth in claim 17, wherein:

said system controller circuit is further configured to vary a processing time, within said predetermined time interval, based on the designated bands, such that said spectrum restorer circuit, said at least one inverse modified discrete cosine transform circuit, and said at least one band composition filter circuit operate during said processing time.

21. A data recovery apparatus for decoding data into a signal corresponding to an audio signal, comprising:

a spectrum restorer circuit configured to restore compressed data in a predetermined block length recovered from a recording medium into a spectrum for every N bands, where N is an integer having a value of at least 2;

said spectrum restorer circuit being further configured to inversely quantize the spectrum restored thereby;

at least one inverse modified discrete cosine transform circuit configured to convert the spectrum into a time-series signal;

at least one band composition filter circuit configured to restore a plurality of time-series signals into a restored time-series signal corresponding to an audio signal;

a system controller circuit configured to control, for said predetermined block length during a predetermined time interval, said spectrum restorer circuit, said at least one inverse modified discrete cosine transform circuit, and said at least one band composition filter circuit;

a mode selection key configured to designate which of said N bands are to be processed by said spectrum restorer circuit, said at least one inverse modified discrete cosine transform circuit, and said at least one band composition filter circuit; and said system controller circuit being further configured to control said spectrum restorer circuit, said at least one inverse modified discrete cosine transform circuit, and said at least one band composition filter circuit based on the designated bands.

22. The data recovery apparatus as set forth in claim 21, wherein a clock signal is supplied to said spectrum restorer circuit, said at least one inverse modified discrete cosine transform circuit, and said at least one band composition filter circuit only when processing the designated bands.

23. The data recovery apparatus as set forth in claim 21, wherein said compressed data comprises audio data.

24. The data recovery apparatus as set forth in claim 21, wherein said system controller circuit is further configured to vary a processing time, within said predetermined time interval, during which said spectrum restorer circuit, said at least one inverse modified discrete cosine transform circuit, and said at least one band composition filter circuit operate.

* * * * *